S. R. BERGMAN.
DYNAMO ELECTRIC MACHINE.
APPLICATION FILED OCT. 26, 1914.
1,203,468.
Patented Oct. 31, 1916.
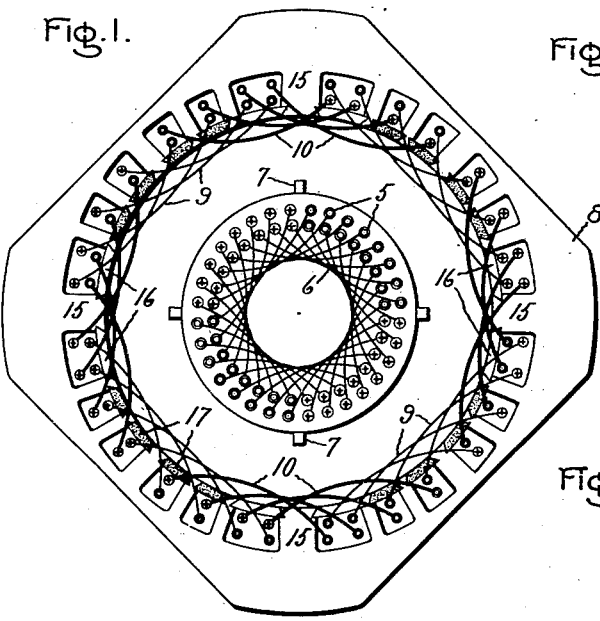
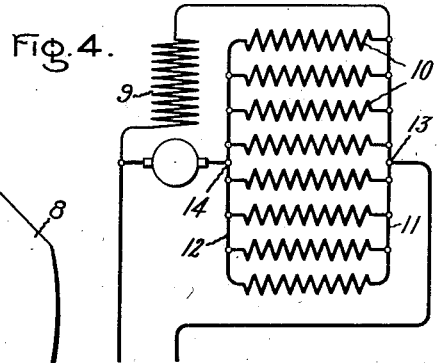
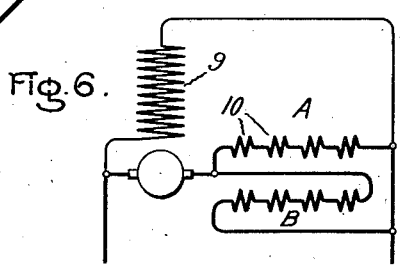
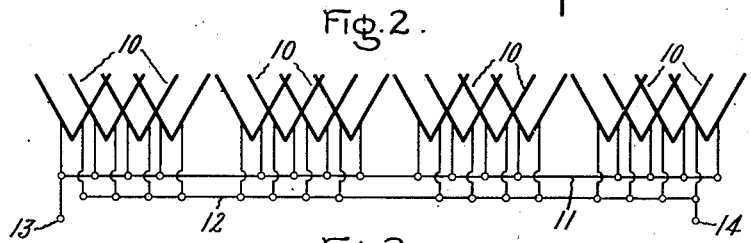
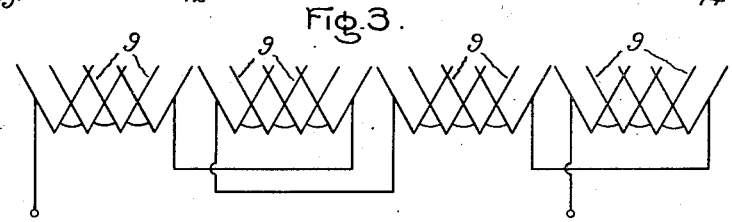
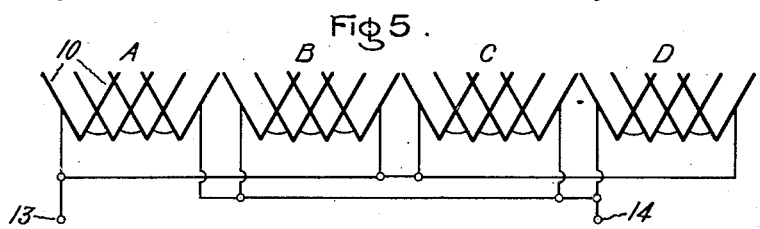
Witnesses:
Inventor:
Sven R. Bergman,
by His Attorney.

UNITED STATES PATENT OFFICE.

SVEN R. BERGMAN, OF LYNN, MASSACHUSETTS, ASSIGNOR TO GENERAL ELECTRIC COMPANY, A CORPORATION OF NEW YORK.

DYNAMO-ELECTRIC MACHINE.

1,203,468.  Specification of Letters Patent.  Patented Oct. 31, 1916.

Application filed October 26, 1914. Serial No. 868,606.

*To all whom it may concern:*

Be it known that I, SVEN R. BERGMAN, a subject of the King of Sweden, residing at Lynn, county of Essex, State of Massachusetts, have invented certain new and useful Improvements in Dynamo-Electric Machines, of which the following is a specification.

My invention relates to dynamo-electric machines, and particularly to compensated direct current dynamo-electric machines.

More especially my invention relates to a direct current dynamo-electric machine having a distributed compensating winding, and in particular to a compensated direct current dynamo-electric machine of the type disclosed in my United States Letters Patent No. 1,173,090, dated Feb. 22, 1916.

The object of my invention is to improve the arrangement of the compensating winding in a compensated direct current dynamo-electric machine.

More particularly the object of my invention is to provide a form of uniformly distributed compensating winding connection whereby the degree of compensation, and particularly the degree of over-compensation, may be finely adjusted.

More specifically the object of my invention is to provide an arrangement of the compensating winding whereby an accurate, convenient and economic adjustment of the desired degree of compensation may be obtained in a compensated direct current dynamo-electric machine of the type disclosed in my aforementioned patent.

The novel features which I believe to be patentably characteristic of my invention are definitely pointed out in the claims appended hereto.

The principle of my invention and its application to a direct current dynamo-electric machine will be understood from the following description taken in connection with the accompanying drawings, in which:—

Figure 1 is a diagrammatic end view of a four-pole compensated direct current dynamo-electric machine of the type described in my aforementioned patent; Fig. 2 is a diagram of the connections of the coils of the compensating winding in accordance with the principle of my present invention; Fig. 3 is a diagram of the connections of the coils of the exciting winding of the machine; Fig. 4 is a diagrammatic representation of the various windings of a compensated direct current dynamo-electric machine embodying the principle of my invention; Fig. 5 is a diagram of a modified form of connections for the coils of the compensating winding; and Fig. 6 is a diagram of the connections of the motor windings where the coils of the compensating winding are connected as represented in Fig. 5.

The type of machine to which my invention particularly relates employs a uniformly distributed compensating winding which is designed to overpower the armature reaction at every point. The compensating winding is composed of a plurality of coils suitably carried in distributed slots in a field magnet member. Heretofore, the individual coils of the compensating winding have been connected in series with one another and in series relation with the armature winding. The entire compensating winding is ordinarily shunted by a resistance whose value is varied to obtain the desired adjustment of the compensation. I have discovered that if the individual coils of the compensating winding are so designed that they may be connected, in whole or in part, in parallel with one another, a very accurate and sufficiently fine adjustment of the compensation may be obtained by so connecting them and varying the number of turns in the individual coils to obtain the desired adjustment. A fine adjustment of the compensation cannot be obtained by varying the number of turns of the individual coils of the compensating winding when the individual coils are connected in series, and hence it has heretofore been necessary and customary to employ the shunted rheostat, as above mentioned, in order to secure the proper degree of compensation.

In Fig. 1 of the drawings there is diagrammatically represented a compensated direct current dynamo-electric machine of the type disclosed in my aforementioned patent. This machine has an armature member carrying a commuted armature winding diagrammatically represented by the conductors 5. The armature winding is a full-pitch winding as clearly indicated by the end connections 6. Brushes 7 are operatively related to the armature winding commutator in the well known manner. The field magnet member 8 of the machine has its magnetic material distributed around the armature member to form a substantially uniform air-gap, and has a slotted circular inner periphery. The outer periphery of the field magnet member has an approximately polygonal configuration, the particular advantages of which are described in detail in my United States Letters Patent No. 1,173,089, dated February 22, 1916. Two sets of coils 9 and 10 are carried in the slots in the field magnet member. These coils are uniform in shape and dimensions, but are wound with wire of different cross-section, since one set of coils is connected as an exciting winding in shunt to the armature winding, while the other set of coils is connected as a compensating winding in series relation with the armature winding. The current distribution in the conductors of the several windings is shown in Fig. 1 of the drawings by means of the usual convention, in which crosses and circles applied to the conductors indicate respectively that the current is flowing away from and toward the observer. The exciting or shunt coils 9 are shown in light lines, and the coils 10 of the compensating winding are shown in heavy lines.

It will be seen that both compensating and exciting windings are completely and uniformly distributed two-layer lap windings, so that each slot contains coils of each winding. By observing the direction of current flow in the exciting coils 9, as indicated by the crosses and circles, it will be seen that four poles are produced. It will further be seen that the compensating winding 10 similarly produces four poles, which are displaced 45 physical or 90 electrical degrees from the poles of the exciting winding. Thus the exciting and compensating windings are arranged somewhat like the two phases of the winding of a two-phase induction motor, except that each winding is completely distributed instead of being distributed over only 50 per cent. of the periphery, as is common in a two-phase induction motor. The coils of the exciting and compensating windings are of 50 per cent. pitch, whereby a material saving in copper is effected by the shortened end connections.

It will be observed that the corners of the outer periphery of the field magnet member are slightly cut away to give each corner an arcual configuration. This particular configuration of the field magnet member facilitates the assembling of the member in the frame of the motor, which is generally circular, and is disclosed in an application filed by me January 12, 1911, Serial No. 602,205. I have shown the inner periphery of the field magnet member provided with definite commutating teeth 15, there being one commutating tooth per pole. Each commutating tooth is separated from the adjacent tooth on each side thereof by a relatively wide slot, and each of the relatively wide slots is closed with a non-magnetic wedge 16, while each of the other slots in the field magnet member is closed by a magnetic wedge 17. This construction of the particular type of machine in connection of which I have illustrated my present invention is described and claimed in my aforementioned Patent No. 1,173,090.

In accordance with my present invention, the individual coils of the compensating winding are connected in parallel with one another, instead of in series with one another as has heretofore been the practice. The parallel connection of the individual coils is diagrammatically represented in Fig. 2 of the drawings, where the four individual coils 10 per pole have their terminals connected to common conductors 11 and 12. Conductor 11 is provided with a terminal 13 while conductor 12 is provided with a terminal 14. The terminals 13 and 14 serve to connect the compensating winding as a whole in series relation with the armature winding. The electrical relation of the individual coils of the compensating winding to one another and of the winding as a whole to the armature winding is clearly indicated in Fig. 4 of the drawings. As indicated in Fig. 3 of the drawings the individual coils 9 of the exciting winding are connected in series with one another.

In order to obtain sparkless commutation it is necessary that the strength of the compensating winding be greater than the strength of the armature winding, since the compensating winding should force a flux through the commutating tooth, which flux is needed in order to reverse the electromotive force of self-induction. The degree of compensation is indicated by the ratio of the strength of the compensating winding to the strength of the armature winding, and where this ratio is greater than unity the machine is over-compensated. I have found that the over-compensation may vary from one per cent. to twenty-five per cent., depending upon the amount of self-induction in the armature; the rule being that the larger the self-induction of the armature, the larger should be the over-compensation. When the proper degree of over-compensation has been determined, the problem remains to adjust the compensating winding to give this particular desired degree of compensation. As hereinbefore mentioned this adjustment has heretofore been effected by a variable resistance connected in shunt with the compensating winding. Where the individual coils of the compensating winding are connected in parallel in accordance with my present invention, the degree of compensation can be satisfactorily adjusted by varying the number of turns in the individual coils. This will be more clearly understood by the following specific example.

The strength of the armature winding may be represented by the formulæ

$$(S \cdot C \cdot I),$$

where S represents the number of slots in the armature member, C the number of conductors per slot, and I the current flowing in the conductors. Similarly, the strength of the compensating winding may be represented by $$(S^1 \cdot C^1 \cdot I^1),$$

where $S^1$ represents twice the number of coils of the compensating winding, $C^1$ the number of turns per coil, and $I^1$ the current flowing in each turn. The degree of compensation may then be represented as follows:

$$\text{Degree of compensation} = \frac{S^1 \cdot C^1 \cdot I^1}{S \cdot C \cdot I}$$

Taking as a numerical example a machine having a two-circuit armature and a compensating winding having sixteen individual coils connected in multiple in accordance with my present invention, we may substitute for the various quantities in the above equation the actual values employed in such machine, thus obtaining the following equation:

$$\text{Degree of compensation} = \frac{32 \cdot 125 \cdot \frac{I}{8}}{40 \cdot 12 \cdot I} = 1.04$$

Where the armature winding is divided into two circuits connected in parallel the total armature current is obviously 2I, where the current in each armature circuit is I, and the current in each conductor of the compensating winding is then $$\frac{2I}{16} = \frac{I}{8};$$

that is to say $$I' = \frac{I}{8}.$$

The degree of compensation in the example above given is thus represented by 1.04, so that the machine is over-compensated. Assume that it is desired to obtain this degree of compensation in a machine in which all of the coils of the compensating winding are connected in series. The unknown quantity ($ts$) is the number of turns per coil of the compensating winding and the equation becomes:—

$$\text{Degree of compensation} = \frac{32 \cdot ts \cdot 2I}{40 \cdot 12 \cdot I} = 1.04$$
$$ts = 7.8$$

It will be obvious that 7.8 turns is impossible, since it is impracticable to have a fraction of a turn. If we take the nearest approximation of 7.8 turns, that is 8 turns, it will be found that the degree of compensation is represented by 1.067. On the other hand if we take 7 turns the degree of compensation is represented by 0.93. It will thus be seen that it is impossible to obtain a compensation of 1.04, with an accuracy of one per cent., by varying the number of turns where the coils of the compensating winding are connected in series. On the other hand if we increase the number of turns of the coils by one, when the coils are connected in parallel, making the number of turns per coil 126 instead of 125, the compensation becomes 1.05, and similarly if we have 124 turns the compensation becomes 1.03. It will thus be evident that the compensation can be adjusted within one per cent. by varying the number of turns per coil of the compensating winding when the individual coils are connected in parallel.

In machines in which the exciting flux changes very suddenly, as for example in motors where the field is reversed in order to reverse the rotation of the motor, the varying exciting flux induces an electromotive force in each coil of the compensating winding. Since the flux distribution per pole of the magnetic field produced by a distributed lap winding of the type herein described is substantially triangular in form and varies from a maximum at the center of the pole to zero intermediate two poles, the value of this induced electromotive force depends upon the position of the particular coil in the exciting field, so that electromotive forces of different values are induced in the various 50 per cent. pitch coils of the compensating winding, and since, in accordance with my present invention, these coils are connected in parallel there results a flow of exchange currents between the various coils. In machines of this type I, accordingly, divide the coils of the compensating winding into sections, so selected that the total resultant electromotive forces induced by a change in the magnetic field produced by the exciting winding in all the coils of each section are equal, and I connect these sections so that the resultant electromotive force induced in the coils of one section is in opposition to that induced in the coils of a coöperating section. This modification of my invention will be understood by reference to Figs. 5 and 6 of the drawings.

In Fig. 5 of the drawings I have diagrammatically represented the coils 10 of the compensating winding divided into sections A, B, C and D, there being one section of coils for each pole of the machine. The individual coils of each section are connected in series, while the sections are themselves connected in parallel, and in opposition with respect to the voltages induced in the coils thereof by a sudden change in the exciting field of the machine. Thus the total voltage induced in the series-connected coils of section A is equal and opposite to the total voltage induced in the series-connected coils of section B, and the same is true of the sections C and D. Such an arrangement of the coils of the compensating winding prevents the occurrence of exchange currents when the exciting field of the motor is suddenly varied. Fig. 6 of the drawings diagrammatically represents the connections of the windings of a two-pole motor embodying this modified form of my present invention.

It will be obvious to those skilled in the art that where the coils of the compensating winding are divided into sections, the individual coils of which are connected in series, that the same fineness of adjustment of the degree of compensation cannot be obtained by varying the number of turns of the individual coils as can be obtained when all the coils are connected in parallel. However, where the compensating winding has sixteen individual coils divided into four sections connected as represented in Fig. 5 of the drawings, the adjustment of the degree of compensation by varying the number of turns of the individual coils is four times as fine as where all the coils are connected in series as has heretofore been the practice.

The connection, either in whole or in part, of the individual coils of the compensating winding in parallel is of decided advantage in the design and construction of a compensated direct current dynamo-electric machine, and particularly in such a machine of the type illustrated in Fig. 1 of the drawings. The degree of over-compensation having been decided upon, the individual coils are wound with the calculated numbers of turns per coil, or more preferably with one or more turns than the calculated number. Tests may show that the degree of compensation is not correct, in which event all that is necessary is to vary the number of turns per coil until the desired degree of compensation is attained with an accuracy of one per cent. Having thus determined the proper number of turns per coil the coils may be standardized with this particular number of turns for this particular size and type of machine.

It will of course be understood that my invention is not limited to the particular type of compensated direct current dynamo-electric machine in connection with which the invention is herein illustrated. Thus, while I have explained my invention by illustrating and describing a specific embodiment thereof it will be understood that the invention may be embodied in many other forms than that shown and described. I, accordingly, do not wish to be restricted to the particular form and construction disclosed herein by way of example for the purpose of setting forth my invention in accordance with the patent statutes. The terms of the appended claims are, therefore, not restricted to the precise structure disclosed but are intended to cover all changes and modifications within the spirit and scope of my invention.

What I claim as new and desire to secure by Letters Patent of the United States, is,—

1. A direct current dynamo-electric machine having a commuted armature winding, an exciting winding adapted to produce a magnetic field whose flux distribution per pole is substantially triangular in form and varies from a maximum at the center of the pole to zero intermediate two poles, and a uniformly distributed compensating winding comprising a plurality of coils, said coils being divided into a plurality of sections such that the resultant electromotive force induced by a change in the magnetic field produced by said exciting winding is the same in each section, the individual coils of each section being connected in series and the sections themselves being connected in parallel and so that the resultant electromotive forces induced in coöperating pairs of sections by a change in the magnetic field produced by said exciting winding act in opposition to one another.

2. A direct current dynamo-electric machine having a commuted armature winding, a field magnet having distributed slots, a distributed exciting winding composed of uniform coils assembled in said slots as a lap winding, and a compensating winding composed of uniform coils of substantially 50 per cent. pitch assembled in said slots as a lap winding, the coils of said compensating winding being arranged in a plurality of sections such that the resultant electromotive force induced by a change in the magnetic field produced by said exciting winding is the same in each section, the individual coils of each section being connected in series and the sections themselves being connected in parallel and so that the resultant electromotive forces induced in coöperating pairs of sections by a change in the magnetic field produced by said exciting winding act in opposition to one another.

3. A direct current dynamo-electric machine having a commuted armature winding, a field magnet having a plurality of distributed slots per pole, and a two-layer exciting winding and a two-layer compensating winding each composed of uniform coils of substantially 50 per cent. pitch assembled in the slots in said field magnet to form mechanically a single two-layer lap winding, the arrangement and distribution of said exciting winding being such that the flux distribution of each pole of the magnetic field produced thereby is substantially triangular in form and varies from a maximum at the center of the pole to zero intermediate two poles, the coils of said compensating winding being divided into a plurality of sections such that the resultant electromotive force induced by a change in the magnetic field produced by said exciting winding is the same in each section, the individual coils of each section being connected in parallel and so that the resultant electromotive forces induced in coöperating pairs of sections by a change in the magnetic field produced by said exciting winding act in opposition to one another.

In witness whereof, I have hereunto set my hand this twenty-third day of October, 1914.

SVEN R. BERGMAN.

Witnesses:
 JOHN A. McMANUS, Jr.,
 JOHN T. BEECHLYN.